(12) United States Patent
See

(10) Patent No.: US 10,589,199 B2
(45) Date of Patent: Mar. 17, 2020

(54) GRAVITY-FED WATER PURIFICATION SYSTEM

(71) Applicant: Timothy See, Roach, MO (US)

(72) Inventor: Timothy See, Roach, MO (US)

( * ) Notice: Subject to any disclaimer, the term of this patent is extended or adjusted under 35 U.S.C. 154(b) by 154 days.

(21) Appl. No.: 15/832,735

(22) Filed: Dec. 5, 2017

(65) Prior Publication Data

US 2018/0154290 A1 Jun. 7, 2018

Related U.S. Application Data

(60) Provisional application No. 62/430,828, filed on Dec. 6, 2016.

(51) Int. Cl.
| | | |
|---|---|---|
| *B01D 29/58* | (2006.01) | |
| *B01D 29/60* | (2006.01) | |
| *B01D 35/157* | (2006.01) | |
| *B01D 29/56* | (2006.01) | |
| *B01D 39/16* | (2006.01) | |

(Continued)

(52) U.S. Cl.
CPC ............. *B01D 29/58* (2013.01); *B01D 29/15* (2013.01); *B01D 29/56* (2013.01); *B01D 29/605* (2013.01); *B01D 35/1573* (2013.01); *B01D 39/163* (2013.01); *B01D 39/1623* (2013.01); *C02F 1/001* (2013.01); *C02F 1/002* (2013.01); *C02F 1/444* (2013.01); *B01D 2201/188* (2013.01); *B01D 2201/32* (2013.01); *B01D 2239/04* (2013.01); *B01D 2239/0618* (2013.01); *B01D 2239/0659* (2013.01); *B01D 2239/0681* (2013.01); *B01D 2239/1216* (2013.01); *C02F 2103/007* (2013.01); *C02F 2201/005* (2013.01); *C02F 2209/42* (2013.01); *C02F 2301/08* (2013.01)

(58) Field of Classification Search
CPC .......... B01D 2201/32; B01D 2201/188; B01D 2239/04; B01D 2239/0618; B01D 2239/0659; B01D 2239/0681; B01D 2239/1216; B01D 29/15; B01D 29/56; B01D 29/58; B01D 29/605; B01D 35/1573; B01D 39/1623; B01D 39/163; C02F 1/001; C02F 1/002; C02F 1/444; C02F 2103/007; C02F 2201/005; C02F 2209/42; C02F 2301/08
See application file for complete search history.

(56) References Cited

U.S. PATENT DOCUMENTS

| | | | | |
|---|---|---|---|---|
| 2,736,436 A | * | 2/1956 | Fresch .................... | B01D 29/15 210/282 |
| 3,780,867 A | * | 12/1973 | Zirlis ...................... | C02F 9/005 210/266 |

(Continued)

*Primary Examiner* — Terry K Cecil
(74) *Attorney, Agent, or Firm* — Linda L. Lewis

(57) ABSTRACT

A device for providing purified water from a silt-laden source water having an upper canister, a lower canister, and a filter mounted in the upper canister; wherein the upper canister and the lower canister are fluidly connected via the filter; wherein pre-filtered water is collected in the upper canister and purified water is collected in the lower canister; wherein a pre-filter is fluidly connected between the source water and the upper canister; wherein the pre-filter has a pre-filter canister having an inlet for source water and an outlet for pre-filtered water; wherein the pre-filter canister contains a fine depth filter and a felt filter.

12 Claims, 8 Drawing Sheets

(51) Int. Cl.
    *B01D 29/15*     (2006.01)
    *C02F 1/00*     (2006.01)
    *C02F 1/44*     (2006.01)
    *C02F 103/00*     (2006.01)

(56) References Cited

U.S. PATENT DOCUMENTS

| | | |
|---|---|---|
| 4,816,149 A | 3/1989 | Wekell |
| 5,106,500 A | 4/1992 | Hembree |
| 5,411,661 A * | 5/1995 | Heiligman ............ A47J 31/605 |
| | | 210/264 |
| 5,614,085 A * | 3/1997 | Platt, III ............... E04H 4/1263 |
| | | 210/232 |
| 5,928,506 A * | 7/1999 | Bae ........................ C02F 1/003 |
| | | 210/94 |
| 6,454,941 B1 | 9/2002 | Cutler |
| 6,602,425 B2 | 8/2003 | Gadgil |
| 7,871,362 B2 * | 1/2011 | Kohlruss ................ B01D 39/08 |
| | | 29/895 |
| 8,623,206 B2 | 1/2014 | Wilder |
| 10,315,141 B2 * | 6/2019 | Dye ...................... B01D 39/163 |
| 2003/0164333 A1 | 9/2003 | Nohren |
| 2005/0230325 A1 | 10/2005 | Miller |
| 2008/0105618 A1 | 5/2008 | Beckius |
| 2011/0303589 A1 | 12/2011 | Kuennen |
| 2013/0199974 A1* | 8/2013 | Shmidt ................... C02F 1/003 |
| | | 210/104 |
| 2015/0284260 A1* | 10/2015 | Huda ..................... C02F 1/003 |
| | | 210/128 |

\* cited by examiner

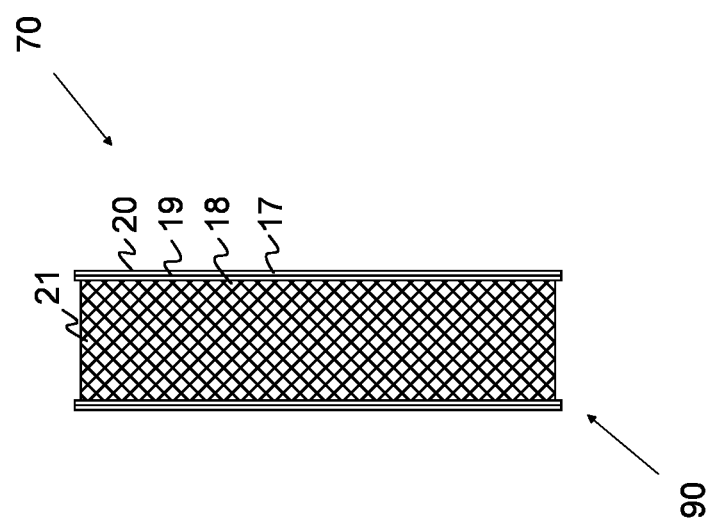
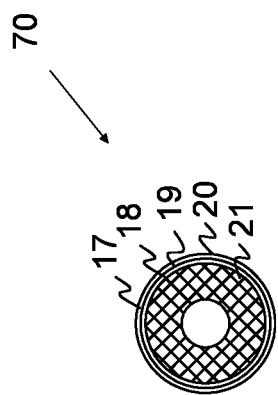

GRAVITY-FED WATER PURIFICATION SYSTEM

CROSS-REFERENCE TO RELATED APPLICATIONS

This application claims priority from U.S. Provisional Patent Application No. 62/430,828 filed Dec. 6, 2016 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a water purification system, and more particularly to a gravity fed water purification system having a pre-filter which is suitable for purifying silt-laden source water.

Related Art

Much of the world's fresh water supply has been contaminated with bacteria, viruses, and chemical pollutants that make it unfit for human consumption. The World Health Organization (WHO) says that, "every year more than 3.4 million people die as a result of water related diseases, making it the leading cause of disease and death around the world."

Although many water purification systems can remove some of these contaminants, very few can deliver water that can meet the EPA and WHO requirements for potable water. Although Reverse Osmosis or Ozone Generators can be used to help mitigate many of these contaminants, both require large amounts of electricity and require skilled maintenance.

The 2009 U. N. Development Program said, "An estimated 79% of the people in the Third World—the 50 poorest nations—have no access to electricity . . . . The total number of individuals without electric power is put at about 1.5 billion . . . ."

Independent lab tests have shown that Multi Contaminant Removal (MCR) filters can remove all three categories of pollutants without using electricity. It easily exceeds the EPA and WHO requirements for bacteria, viruses, and many common chemical pollutants. However, the MCR filters and any other filters with very fine pores can easily be clogged and rendered inoperable. Many potential pre-filter solutions have been attempted, but all have either failed or require such frequent maintenance and numerous replacement parts that the pre-filter itself becomes inoperative. Following are some pre-filtration attempts that we and many others have tried. All have been unsatisfactory.

Failure to pre-filter silt laden water doesn't work. High TSS (Total Suspended Solids ≥2 microns) are common whenever the water source is a silt laden lake, pond, or river, or runoff from a dusty roof. Much of the water that remains after a hurricane or tropical storm is saturated with TSS. These water sources also have high TDS (Total Dissolved Solids ≤2 microns). TSS and TDS≥0.5 microns will quickly clog the MCR filter.

Any micro-filter with an absolute rating (given pore size), can easily be clogged with silt, regardless of the flow velocity. It only takes one particle greater than or equal to the absolute pore size of the micro-filter to clog each pore. Even though larger particles can be partially abraded from the outside of the final filter, particles between 0.5 and 2 microns will lodge inside and permanently clog the filter.

Traditionally, silt laden water has been allowed to remain undisturbed in a settling basin for at least 12 hours prior to placing it into the upper canister of a two bucket drip system. But carefully dipping the water from the top of the settling basin without disturbing the silt has proven quite challenging. Even a slow steady flow of water across the sediment can easily stir it back into the water source. Some clay sediments will never settle to the bottom.

During normal use, the filter will be exposed to the ambient air several times throughout the day. This causes minerals which have precipitated out of the water to crystallize on the outside surface of the final filters. These minerals also clog the final filters and we have not found a suitable way to remove them.

If the filter is pressurized in an attempt to make it automatic, it will no longer be able to properly purify some of the contaminants due to the lack of retention time in the filter.

In a gravity-fed drip filter system, water cannot be placed in the upper canister unless there is enough space in the lower bucket or the lower bucket will overflow. Yet different quantities of water are usually required each day. If you run out of purified water, a long period of time must elapse before it is available again.

A standard high depth pre-filter used by itself will not filter out silt. If the flow velocity is not carefully controlled, it will not remove sufficient silt to protect the MCR Filter. High flow will simply wash the silt through the pre-filter. An absolute rated pre-filter will also quickly clog and may need to be replaced every day.

Even though the best of these absolute (hollow fiber membrane) pre-filters can even remove some of the viruses, they will very quickly clog with silt laden water. Backflushing can be done if you have sufficient pressurized water, but that requires a substantial amount of unavailable electricity and skilled labor.

It doesn't work to use a bio-sand filter as a pre-filter unless a constant flow is maintained. This filter uses a specially controlled environment to harbor beneficial bacteria that will do a good job pre-filtering water. However, if a constant flow is not maintained, the bacteria will die, and effective pre-filtration will stop.

There is a need for a simple, robust system of water purification. U.S. Pat. No. 6,602,425 discloses a two-bucket gravity-fed system that uses a ceramic filter and a source of UV radiation to purify water. It is desirable, however, to purify water without the use of electricity-powered devices such as UV lights. U.S. patent application 2011/0,303,589 uses a gravity fed system that uses a flocculent and chlorine to purify water. It is also desirable to have a system that does not require the use of chemicals. None of the above references disclose the present invention.

SUMMARY OF THE INVENTION

The present invention is a device for providing purified water from a silt-laden source water comprising an upper canister, a lower canister, and a filter mounted in the upper canister. The upper canister and the lower canister are fluidly connected via the filter, wherein pre-filtered water is collected in the upper canister and purified water is collected in the lower canister. A pre-filter is fluidly connected between the source water and the upper canister, wherein the pre-filter has a pre-filter canister having an inlet for source water and an outlet for pre-filtered water. The pre-filter canister contains a fine depth filter and a felt filter, wherein the fine depth filter is encircled by the felt filter. The pre-filter canister is fluidly connected to receive the source water and is fluidly connected to the upper canister which receives the pre-filtered water, wherein fluidly attached to the outlet of the pre-filter canister is a flow regulator that has an open and closed position. In the open position, the pre-filtered water flows into the upper canister, and in the closed position, the pre-filtered water does not flow into the upper canister, and wherein the purified water is collected in the lower canister.

Another embodiment of the present invention is a pre-filter comprising a fine depth filter, a coarse felt filter, and a fine felt filter, wherein the fine depth filter is wrapped in the file felt filter, and the fine felt filter is wrapped in the coarse felt filter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

FIG. 8 is a top perspective of the pre-filter assembly, wound.

FIG. 9 is a side cut-away perspective of the pre-filter assembly, wound.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-9, the water purification system 100 of the present invention has an upper canister system 50, a lower canister system 60, a pre-filter system 70 and a float valve system.

Figure 1:
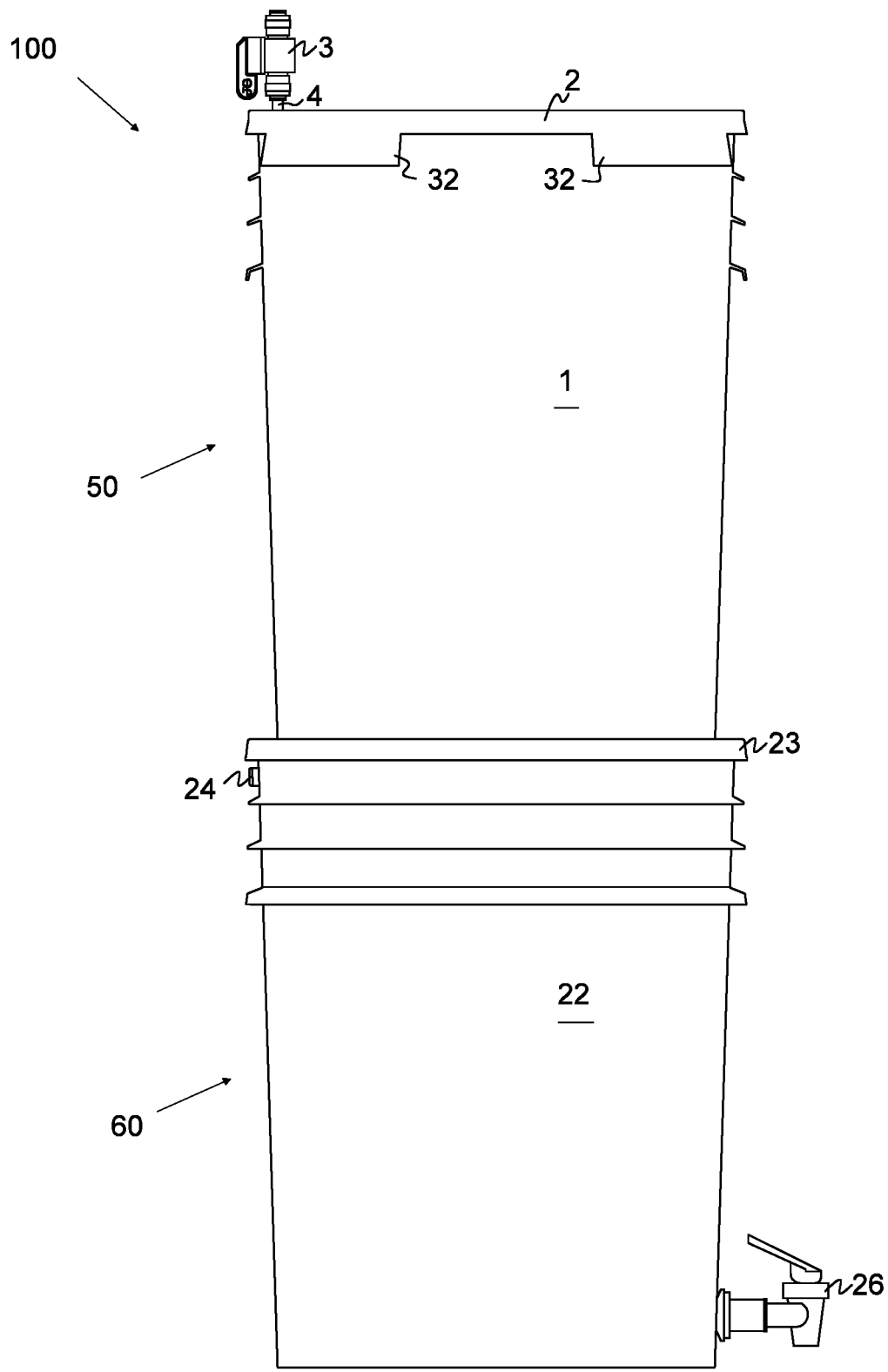
FIG. 1 is a side perspective of the system of the present invention.
Figure 2:
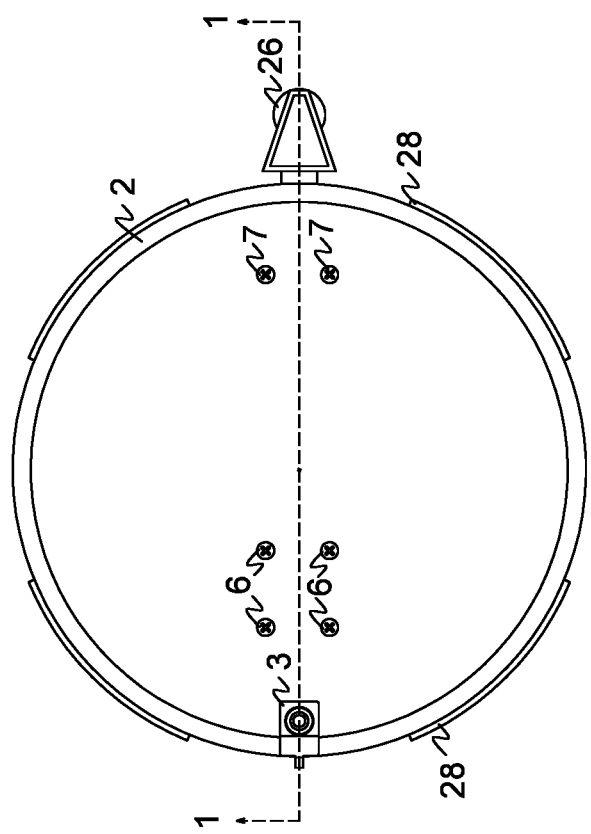
FIG. 2 is a top perspective of the system of the present invention with the lid on it.
Figure 3:
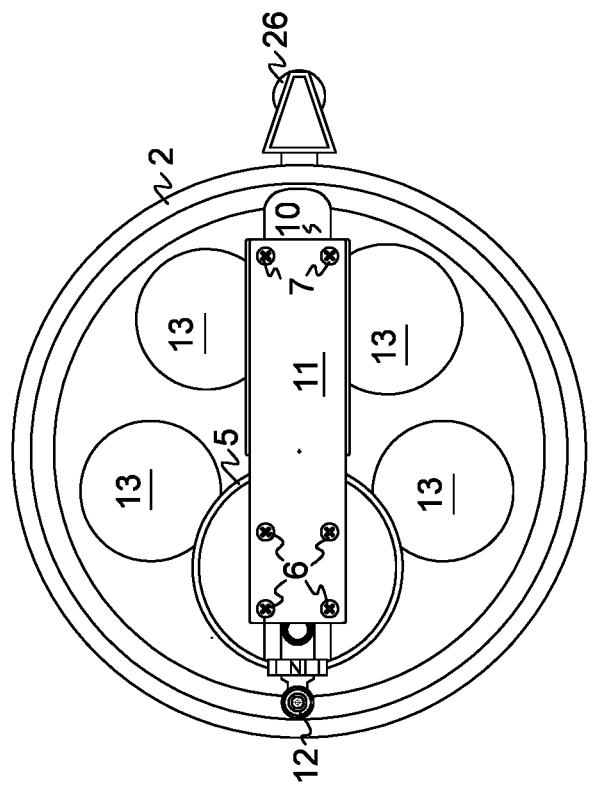
FIG. 3 is a top perspective of the system with the lid removed.

As can be seen in FIG. 1, the present water purification system 100 is made of an upper canister 1 and a lower canister 22, the upper canister arranged above the lower canister. The upper canister has a lid 2 through which is inserted a tubing 4 to allow source water into the interior of the upper canister. While the description refers to a canister, any type of water-tight container or tank can be used. The container must have a removable water resistant lid to prevent insect infestation and infiltration of contaminated water.

Figure 4:
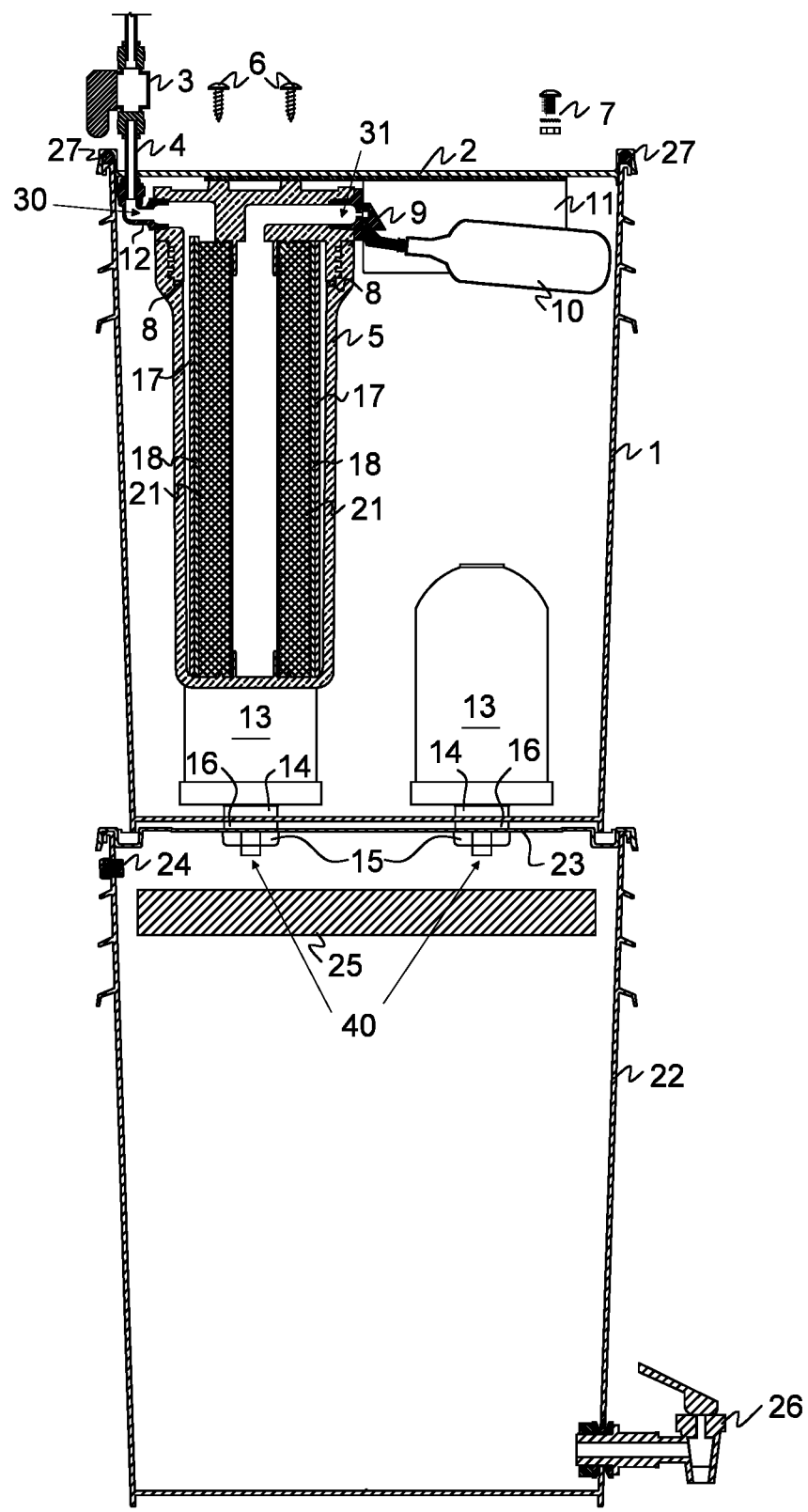
FIG. 4 is a cut-away side perspective of the system of the present invention.
Figure 5:
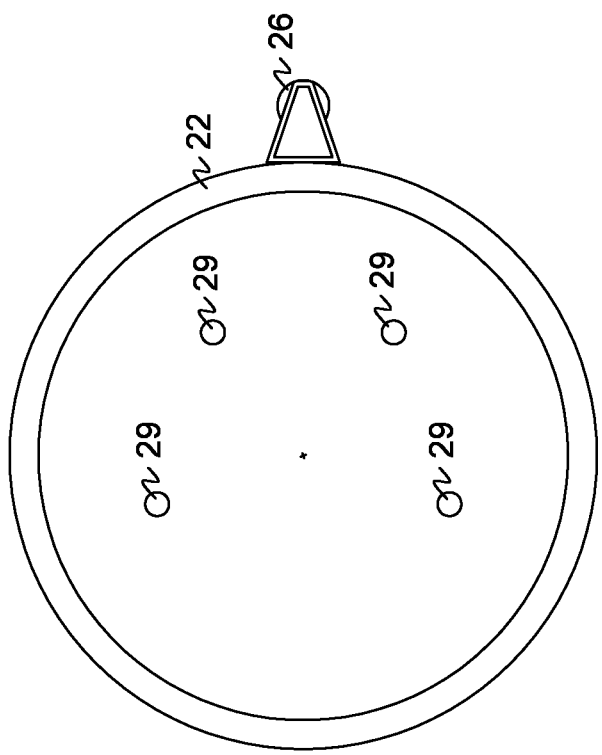
FIG. 5 is a top perspective of the canister with the lid on it.

The water purification system 100 is assembled by inverting the upper canister 1 and resting the top of the lower canister lid 23 on the bottom of the upper canister. Holes are drilled through the lower canister lid (penetrations for multi-contaminate final filters 29) and the bottom of the upper canister, as is shown in FIGS. 4 and 5. The holes are used to assemble the lower canister lid 23, the upper canister 1 and at least one filter 13 into one piece. The assembled lower canister lid is shown in FIG. 4. The openings 29 in the lower canister lid 23 are for the flow of filtered water into the lower canister. The lid of the upper canister 2 with the source water inlet 30 is shown in FIG. 4. A preferred filter is a Clearbrook, LLC gravity water filter, CB-5, which is a micro filter that removes viruses, pathogenic bacteria, trihalomethanes, inorganic minerals, volatile organic compounds, heavy metals, rust, silt, sediment a, turbidity, foul taste and odors.

Figure 7:
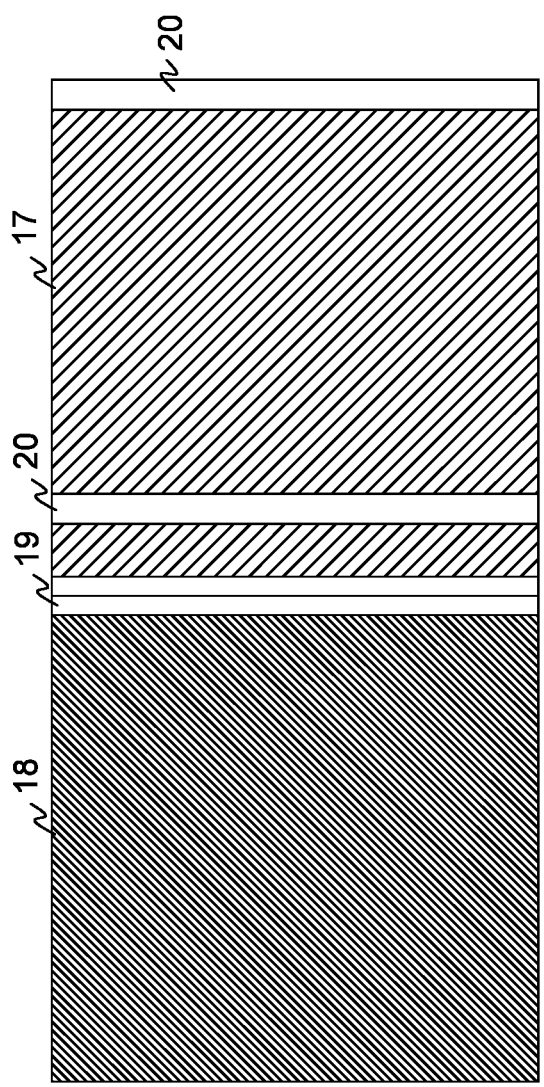
FIG. 7 is a top perspective of the felt pre-filter, unwound.

FIGS. 7 and 8 show the pre-filter system, which is inserted into a pre-filter canister 5. The pre-filter system has a string filter (fine depth filter 21) and felt filters 17 and 18. Source water is fed to the filter through the source water inlet 30. The purified water flowing out of the pre-filter through outlet 31 is regulated by means of a high pressure float valve 9. The float valve 9 is the preferred means of regulating flow, yet other means including float assemblies or bladders would also be effective in regulating the water flow. The float valve serves multiple purposes which include slowing the flow of source water through the pre-filter and maintaining a level of water above the filters so they do not dry out and mineralize. Additionally, a head of water above the filters provides a low pressure system of moving the water through the filters. The float valve has two positions: an up position and a down position. The up position results when the upper canister is full of pre-filtered water and the water pushes the float valve up. In the up position, the flow through and out of the pre-filter stops. In the down position, the pre-filtered water flows from the pre-filter into the upper canister.

As shown in FIGS. 7-9, the pre-filter is assembled by preparing the fine felt filter 18 and the coarse felt filter 17. Preferably, there are two different felts of different finesses. The first and outer coarse felt filter 17 has about 10 micron openings and the second inner fine felt filter 18 has about 5 microns openings. Preferred felts are Filter Media Fabric, with 5 micron openings and with 10 micron openings. The two felts filters are about the same size, about 10 inches by 10 inches and are attached. Preferably, a micro-fiber joining strip 19 is used to join the two filters. It is important that the felts do not overlap, creating a channel to bypass the filter. The felt filter is wound around the string filter (the fine depth filter 21) and attached. A preferred string filter is a white Whole House string wound water filter, about 10 inch by 2.5 inch, with 5 micron openings. Preferably, the felt filter is removably attached using hook and loop fasteners 20. The hook and loop fasteners are attached using polyester thread or by thermal bonding. After the felt filter is wound around the string filter and fastened, it is inserted into the pre-filter canister 5 and mounted on the upper canister lid 2.

The present system uses a unique pre-filter known as a "cake filter" concept to remove most of the dissolved clay, silt and sediment that would normally clog the final filters. In a preferred embodiment, the filter cake 90 has three layers. The first is formed by the coarse felt filter 17, the second is formed by the fine felt filter 18, and the third is by the fine depth filter 21. Using the pre-filter, water will always pass through the upper canister at a well-controlled very slow rate, allowing even extremely fine talcum powder-looking silt that gets through the pre-filter to settle in the bottom of the upper canister.

The life of the filter 13 may be extended from as low as 300 gallons up to 3000 gallons. Cleaning of the entire system is reduced to once every three months or more, even if the source water is very muddy. The filter 13 always remains under water, thus eliminating mineral crystallization on the outer surface of the filter. It is compatible with any pressurized or non-pressurized water system up to 100 psi.

The pre-filter is easily cleaned after use by unwinding the felt filter. The loose silt and debris caught on the outer surface of the felt is brushed or shaken off. After cleaning, the felt filter is re-wound around the string filter and is ready to use again.

As long as some water source is available, no time is required to fill the upper canister. The lower canister will never overflow because of a unique water shut-off float valve will shut off the flow from the filters.

With this system, water can be purified even if the water source is extremely muddy. Preferably, all components including the pre-filter are mounted inside the two food grade HDPE buckets. The pre-filter fastens to the lid of the upper canister. This means retrofitting of systems without the pre-filter can be done by simply changing lids.

In a preferred embodiment, all fittings and water tubing are UV Stabilized Food Grade. These will connect to the water source. The water source can be pressurized as high as 100 psi, a barrel on the roof, or even a third bucket on top of the water filtration system. All water tubing is black ¼" OD HDPE to minimize algae growth inside of the tubing. A ¼" water tube is used to connect to either an existing water supply pipe, or a tank mounted on the roof, or simply a manually filled bucket above the water filters. This ¼" water tube supplies water to an opaque standard 10" water filter canister. This canister can be mounted inside the upper canister, or outside, next to the upper canister. This second option allows more filters and thus a higher water volume per hour.

The 10" cake filter 90 element is made by wrapping one layer of 10 micron singed polypropylene felt filter fabric around one layer of 5 micron singed polypropylene felt filter fabric. These are tightly fastened with a hook and loop fastener around a standard ten inch 5 micron string filter. The low water velocity through this filter allows the pre-filter to acclimate and gradually collect silt and sediment on location. This collected silt which will act as a cake filter to efficiently adapt itself to the specific sizes of particles available in that location.

Figure 6:
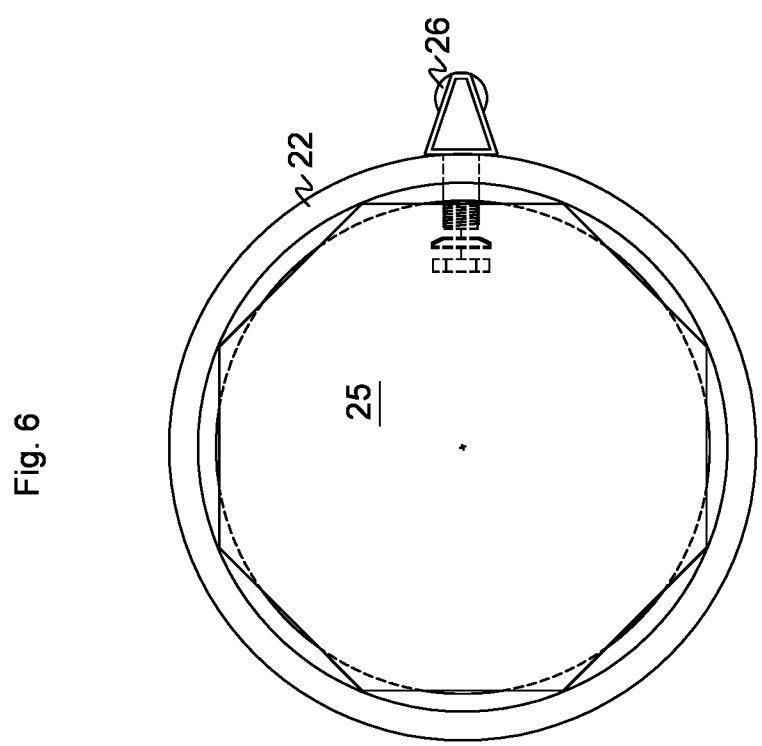
FIG. 6 is a top perspective of the canister with the lid removed.

As shown in FIG. 6, a food grade low pressure float valve 25 regulates flow into the lower canister so that it never overflows. Preferably, a flat piece of 2 lb. density food grade cross-linked polyethylene foam cut in a 10 inch octagon floats in the lower canister. The octagon shape is preferred, as it does not bind to the wall of the cylindrical container as would a circular shape. It is critical that the polyethylene foam is flat and has not be rolled for storage or shipping. Any curvature causes the float valve to fail. Other devices such as a bladder or other type of float can also be used. When the lower canister is full, the foam will float, capping off the filters 13 in the upper canister at the openings 40 in the lower canister lid. When the filters 13 are capped off, the water in the upper canister will rise, moving the high pressure float valve 9 to the "up" position and stop flow through the pre-filter system 70.

Purified water is available by opening a spigot 26 near the bottom of the lower canister. Each system that is equipped with 2 filters 13 will provide about 31 gallons of purified water per day, enough drinking and cooking water for a large family. Four filters 13 should provide 62 gallons per day.

A breather vent 24 is inserted into the lower canister, preferably near the lid, to allow air into the lower canister when the purified water is removed via the spigot. A preferred vent is a sintered plug which prevent insects from entering the lower canister.

Five months of testing was done using extremely muddy, fish smelling water. Purified water production did not diminish during that period. The system was cleaned once after three months.

The upper canister system 50 has an upper canister 1. The upper canister must be sized to deliver the desired total head pressure (water pressure) and flow rate through the purification system. The upper canister that is too tall will not work because the increased water pressure and flow rate will destroy the integrity of the filter cake inside the pre-filter. A shorter canister will work but, it will provide less purified water per hour. The pre-filter canister 5 may be mounted outside of the upper canister, or inside the upper canister. Preferably the upper canister is a dark color (black or dark blue) which helps prevent light penetration and thus helps prevent algae growth inside the container. Preferably, five gallon buckets with lids are effective, with the dimensions 11.91" top outer diameter, 10.33" bottom outer diameter and 14.5" high. However the present invention is not limited to any particular shape or sized canister.

The upper canister lid 2 provides a stop for the float valve and keeps insects and debris out of the water supply. It also helps prevent the water in the top canister from being disturbed which helps preserve the ability of the top canister to also act as a settling basin for extremely fine silt that has not been removed by the pre-filter.

A UV inhibited water inlet ball valve 3 is required to adjust the flow accurately to enable acclimation of the pre-filter. Gate valves and globe valves do not provide a visual indication of the valve position. UV inhibition helps prevent degradation especially when used in tropical climates.

Food Grade UV Inhibited Tubing 4 helps prevent degradation from UV light. Preferably, it is black colored which eliminates light penetration and thus helps prevent algae growth inside the tubing.

Preferably Pre-filter Canister 5 is able to withstand 100 psi pressure because it is located before the float valve 9. It must also provide enough internal space to accommodate both the standard 10"×2¼" Fine Depth Filters 21 it was designed for and multiple layers of additional filtration media.

Preferably the Stainless Steel Pre-Filter Mounting Screw 6 fasteners are stainless steel to prevent corrosion due to the continuous water exposure.

Preferably the Stainless Steel Handle Bracket Bolt, Washer, and Nut 7 fasteners are stainless steel to prevent corrosion due to the continuous water exposure.

Preferably the O-Ring Seal 8 is rated for at least 100 psi to accommodate incoming water pressure. If it were to leak, the top canister would overflow and the pre-filter would be bypassed. This would soon clog the Multi Contaminant Removal (MCR) Filter 13.

The High Pressure Float Valve 9 is critical because it is responsible to prevent excess flow (and thus excess pressure) in the top canister. If it were to fail, the MCR final filters would lose their ability to totally purify the water due to lack of retention time. This would also allow the top canister to overflow.

Preferably the PVC Float 10 must be large enough to allow the float valve to adequately control the water flow, especially during periods of high incoming water pressure. Preferably, it is food grade to help prevent further contamination of the water.

The Handle Bracket 11 enables disassembly of the pre-filter canister for cleaning every 90 days. It also is designed to protect the float valve from damage during shipping, assembly, and disassembly.

Preferably, the Inlet Fitting 12 is able to withstand 100 psi incoming water pressure when the float valve closes. A preferred fitting is a ⅜" MIP to ¼" Push In Fitting. This is the primary point of high pressure failure when using any brand other than JOHN GUEST® fittings.

Preferably, the Multi Contaminant Removal (MCR) Filter 13 removes bacteria, viruses and many chemicals. It properly controls the flow velocity through the Filter Cake that accumulates inside the pre-filter. Excess velocity destroys the filter cake which removes the silt. When MCR filter 13 is used with the pre-filter system 70, each MCR filter 13 can be used to purify up to 3,000 gallons of water before it needs to be replaced. A preferred filter is a Clearbrook, LLC gravity water filter, CB-5, which is a micro filter that removes viruses, pathogenic bacteria, trihalomethanes, inorganic minerals, volatile organic compounds, heavy metals, rust, silt, sediment, turbidity, foul taste and odors.

The Multi Contaminant Removal Filter Sealing Washer 14 prevents contaminated water from bypassing the MCR Filter 13.

The Multi Contaminant Removal Filter Nut 15 is used to compress the MCR Filter 13 base to the Sealing Washer 14 to the bottom of the Upper Canister 1 to the Inter-Canister Sealing Washer 16 to the Lower Canister Lid 23.

The Inter-Canister Sealing Washer 16 is used to prevent water that is spilled on the Lower Canister Lid 23 from leaking into the Lower Canister 22 which should only contain purified water.

The Coarse Felt Filter 17 is used to accumulate an outer shell of the Filter Cake 90 that is developed during the acclimation process. This layer accumulates larger particles of silt which in turn filter larger particles of silt. This helps prevent the Fine Felt Filter 18 from clogging. This media must be sintered on the outside to make it easy to clean with a brush or sponge once every 90 days. A preferred felt for both the Coarse Felt Filter 17 and the Fine Felt Filter 18 is Filter Media Fabric, 5 micron and 10 micron, respectively.

The Fine Felt Filter 18 is required to accumulate a second layer of smaller diameter silt particles. This layer of lower porosity Filter Cake 90 will help prevent the Fine Depth Filter 21 from clogging.

The Micro-Fiber Joining Strip 19 is required to join the Coarse Felt Filter 17 to the Fine Felt Filter 18. This junction must be a tight butt joint, not an overlap joint. An overlap joint provides a vertical preferential flow path for contaminated water through the pre-filter, allowing the pre-filter to be by-passed. This prevents a proper filter cake from forming.

Preferably the Hook and Loop Fastener 20 is used to securely fasten the multiple layers of Coarse and Fine Filter Media (17 and 18) without leaving a preferential flow path through the pre-filter. Hook and Loop Fastener is also required to make it easy to remove the Coarse and Fine Filter Media for cleaning every 90 days.

The Fine Depth Filter 21 is used to collect a third, very fine deep layer of silt. A preferred Fine Depth Filter 21 is a string filter such as a white Whole House string wound water filter, 10 inch by 2.5 inch, with 5 micron openings. The third layer of silt must be much thicker than the first and second layers to prevent clogging. The resulting third layer of very fine Filter Cake 90 is required to complete the pre-filtration process.

The Lower Canister 22 is used to accumulate and dispense purified water. Preferably, it is be food grade and an opaque color to prevent light from encouraging algae growth inside the canister. However, it is not limited in size. It may be as large as needed to meet the required volume of purified water per day. Larger lower canisters can have as many Upper Canister Assemblies mounted on top as needed to provide the required flow rate.

Preferably, the Lower Canister Lid 23 is strong enough to support the weight of upper canister full of water. Preferably it is food grade as well as opaque. Because of the weight of the upper canister, an adequate seal is provided and an O-ring seal is not required. Preferably the lid is easily removed for cleaning when the upper canister is full of water.

The Breather Vent 24 is used to prevent a vacuum in the Lower Canister. A vacuum would pull water more rapidly through the Multi Contaminant Removal Filter 13, diminishing its capabilities and damaging the Filter Cake 90. This Breather Vent 24 allows water to be dispensed from the Lower Canister 22 as rapidly as needed.

The Food Grade Low Pressure Float Valve 25 stops the flow through the Multi Contaminant Removal Filters 13 when the lower canister is full. This prevents the Lower Canister 22 from overflowing.

Preferably, the Water Outlet Spigot 26 is UV inhibited to prevent degradation from ambient light. Preferably, it is large enough to quickly fill a container regardless of the total head available from the Lower Canister 22. This is critical when the Lower Canister 22 water level is low.

The Upper Canister O-ring Seal 27 prevents small insects (such as very tiny ants) from getting to the water in the top canister. It also provides a "spring effect" that allows the Lid Lock Tabs to "snap" closed.

The Lid Lock Tabs 28 lock the upper lid in place. If they are not locked, both the lid and all the components will float causing the water in the top canister to overflow.

The Penetrations 29 for Multi Contaminant Filters 13 in the Lower Canister Lid must be matched to the exact placement of the MCR Filters 13 in the bottom of the Upper Canister 1. Two penetrations are generally provided to accommodate enough MCR Filters 13 for an average size family. Optionally, two additional penetrations are marked to accommodate two more MCR Filters 13 when larger flow rates are required. Typically, more than four Multi Contaminant Removal Filters 13 will allow too much water velocity which would destroy the Filter Cake 90 inside the Pre-Filter system 70.

Filter cake used as a pre-filter fails unless the forward velocity is very carefully controlled. Filter Cake is a collection of various sizes of sediment and silt that is used as a filtration media. These filters collect small portions of the Total Suspended Solids in the water and use various sizes of these particles to very effectively remove additional particles of similar or smaller size.

High pressure differential across a filter will deliver more water velocity. However, the filter cake cannot be developed if the forward velocity of the water is too high as higher water velocity creates preferential flow paths through the filter. These flow paths will allow silt to bypass the filtration process.

Using a taller upper canister in an attempt to increase the head and thus the flow rate through Filter Cake also fails. Doing so destroys the filter cake.

Using a one stage or a two stage pressure reduction valve fails to adequately control the pressure. This is because much of the time the source water pressure is either too high or too low to enable these valves to function. Incoming water pressure will typically vary between 2 and 100 psi. One stage pressure reduction valves are not effective when the water source is too high. Two stage pressure reduction valves will not work when the pressure is too low. With varying input pressure, neither valve can deliver a low enough pressure for the MCR Filter. Pressure reduction valves themselves often clog and become dysfunctional when using non-purified mineral and silt laden water.

If the filter cake dries out, the filter cake will develop cracks which will allow silt to easily pass through. A filter cake must remain submersed in water.

The various sizes of polypropylene felt must be in full contact. The coarse layer must be in full contact with the medium layer which must be in full contact with the string filter. Otherwise various sizes of filter cake will not be properly developed.

Silt and sediment particles vary substantially in size. If filter cake is to be used effectively as a pre-filter, some of the silt-laden water it is intended to pre-filter must be allowed to very slowly flow through the pre-filter to acclimate the pre-filter prior to use.

If the pre-filter cannot be easily cleaned, it will very likely be discarded.

The correct combination of pre-filter media layers must be used. Doing so will allow enough depth for the filter cake or enough retention time to develop the proper filter cake. If the proper filter cake is not developed, silt will migrate through the pre-filter and clog up the final filter.

Preferably, the pre-filter system 70 consists of two layers of felt, the coarse felt filter 17 and the fine felt filter 18, tightly wrapped around the Fine Depth Filter 21. In a preferred embodiment, the fine depth filter is a nominal 2.5"×10", 5 micron string filter.

In a preferred embodiment, both layers of felt have the following characteristics. Preferably, the felt base is polypropylene felt. Polyester felt fails to adequately filter. Preferably, the density is about 12 ounces per square yard. A lower density fails to provide adequate tortuosity to separate and retain the silt, which prevents the formation of adequate filter cake. Preferably, the non-compressed thickness of the felt media is about 0.115±0.006" thick. A smaller thickness does not perform as well. Preferably, the surface of the outer side of each felt layer is singed. An open fiber face does not work well, because the felt does not have enough directional stability to seal well at the top and bottom of the filter canister. Furthermore, if the felt is not singed, it is much more difficult to clean every 90 days.

Preferably, each piece of felt is cut about 10.125"±0.05" tall. If it is cut shorter, it will not seal at the top or bottom of the canister, which allows silt to bypass the cake filter. If it is cut taller, it crumples at the bottom of the filter canister, which also provides bypass passageways for the silt.

Preferably, each felt piece is cut about 10.125"±0.1" wide. If it is narrower, the outer layer of felt will not lap the inner layer of felt enough to enable a continuous layer of filter cake to form. If it is cut wider, the diameters of the rolled layers of felt will exceed the inside diameter of the bottom of the filter canister. This compresses the felt and prevents the development of the filter cake at the bottom of the pre-filter. Preferably, the outer layer of felt must be needle pricked to a porosity of about 10 micron. Preferably, the inner layer of felt must be needle pricked to a porosity of about 5 micron. Preferably, the two layers of felt must be tightly sewn together in the same plane using a butt splice gusseted with Micro-fiber Joining Strip 19. Preferably, the Micro-fiber Joining strip 19 is a polyester or PTFE microfiber basting sewn with polyester thread. Preferably, each end of the seams is back-stitched to prevent unraveling. It does not work to overlap and seam stitch the felt because an air space will be formed between the two layers of felt. This air space will not allow the various sizes of filter cake to be properly developed.

Preferably, the Hook and Loop Fastener 20 is a VELCRO® fastener that is about 0.625"±0.06" wide. If it is narrower, it does not keep the felt wrapped tightly enough to prevent spaces from forming between the layers of felt. These spaces would prevent the filter cake from forming. If the Fastener is wider, it needlessly diminishes the area of the pre-filter, thus diminishing the volumetric capabilities of the pre-filter, and increasing the flow velocity through the remaining filtration area. Preferably, polyester thread is used for stitching the Fastener. Preferably, each end of each seam is back stitched to prevent unraveling. The present invention includes other releasable fasteners that can provide the needed fastening properties.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A pre-filter system for filtering silt-laden source water comprising a pre-filter canister having an inlet for the silt-laden source water and an outlet for pre-filtered water,
   wherein the pre-filter canister contains three layers comprising a singed coarse felt filter, a singed fine felt filter, and a depth filter;
   wherein the singed coarse felt filter and the singed fine felt filter are butt joined together;
   wherein the depth filter is a string filter;
   wherein the singed coarse filter is wound around the outer surface of the depth filter; and
   wherein the singed fine felt filter is wound around the outer surface of the singed coarse filter and attached.

2. The pre-filter system of claim 1, wherein the singed coarse felt filter and the singed fine felt filter are butt joined together with a joining strip stitched to the singed coarse felt filter and the singed fine felt filter.

3. The pre-filter system of claim 2, wherein the singed coarse felt filter is polypropylene felt with 10 micron openings, and the singed fine felt filter is polypropylene felt with 5 micron openings.

4. The pre-filter system of claim 3, wherein the depth filter is a 5 micron string filter.

5. The pre-filter of claim 4, wherein the singed coarse felt filter and the singed fine felt filter are wrapped around the string filter and attached using a hook and loop attachment device.

6. A device for providing purified water from a silt-laden source water comprising an upper canister, a lower canister, and a filter mounted in the upper canister;
   wherein the upper canister and the lower canister are fluidly connected via the filter;
   wherein pre-filtered water is collected in the upper canister and purified water is collected in the lower canister;
   wherein a pre-filter is fluidly connected between the source water and the upper canister;
   wherein the pre-filter has a pre-filter canister having an inlet for source water and an outlet for pre-filtered water;
   wherein the pre-filter canister contains three layers comprising a singed coarse felt filter, a singed fine felt filter, and a depth filter;
   wherein the singed coarse felt filter and the singed fine felt filter are butt joined together;
   wherein the depth filter is a string filter;
   wherein the singed coarse filter is wound around the outer surface of the depth filter;
   wherein the singed fine felt filter is wound around the outer surface of the singed coarse filter and attached;
   wherein the pre-filter canister is fluidly connected to receive the source water and is fluidly connected to the upper canister which receives the pre-filtered water;
   wherein fluidly attached to the outlet of the pre-filter canister is a flow regulator that has an open and closed position;
   wherein in the open position, the pre-filtered water flows into the upper canister; and in the closed position, the pre-filtered water does not flow into the upper canister; and
   wherein the purified water collects in the lower canister.

7. The device for providing purified water from a silt-laden source water of claim 6, wherein the singed coarse felt filter and the singed fine felt filter are butt joined together with a joining strip stitched to the singed coarse felt filter and the singed fine felt filter.

8. The device for providing purified water from a silt-laden source water of claim 7, wherein the singed coarse felt filter is polypropylene felt with 10 micron openings, and the singed fine felt filter is polypropylene felt with 5 micron openings.

9. The device for providing purified water from a silt-laden source water of claim 8, wherein the depth filter is a 5 micron string filter.

10. The device for providing purified water from a silt-laden source water of claim 9, wherein the singed coarse felt filter and the singed fine felt filter are wrapped around the string filter and attached with a hook and loop attachment device.

11. The device for providing purified water from a silt-laden source water of claim 10, further comprising a low pressure float valve in the lower canister, wherein when the lower canister is filled with filtered water, the float valve blocks the flow of water out of the filter;
   wherein when the low pressure float valve blocks the flow of water out of the filter, the pre-filtered water collects in the upper canister; and
   wherein the low pressure float valve is a flat piece of cross-linked polyethylene foam.

12. A device for providing purified water from a silt-laden source water comprising an upper canister, a lower canister, and a filter mounted in the upper canister;
   wherein the upper canister and the lower canister are fluidly connected via the filter;
   wherein pre-filtered water is collected in the upper canister and purified water is collected in the lower canister;
   wherein a pre-filter is fluidly connected between the source water and the upper canister;
   wherein the pre-filter has a pre-filter canister having an inlet for source water and an outlet for pre-filtered water;
   wherein the pre-filter canister contains three layers comprising a singed coarse felt filter, a singed fine felt filter, and a depth filter;
   wherein the singed coarse felt filter and the singed fine felt filter are butt joined together with a joining strip stitched to the singed coarse felt filter and the singed fine felt filter;
   wherein the depth filter is a string filter;
   wherein the singed coarse filter is wound around the outer surface of the depth filter;
   wherein the singed fine felt filter is wound around the outer surface of the singed coarse filter and attached;
   wherein the pre-filter canister is fluidly connected to receive the source water and is fluidly connected to the upper canister which receives the pre-filtered water;
   wherein fluidly attached to the outlet of the pre-filter canister is a flow regulator that has an open and closed position;
   wherein in the open position, the pre-filtered water flows into the upper canister and in the closed position, the pre-filtered water does not flow into the upper canister;
   wherein the purified water collects in the lower canister;
   wherein the singed coarse felt filter is polypropylene felt with 10 micron openings, and the singed fine felt filter is polypropylene felt with 5 micron openings;
   wherein the depth filter is a 5 micron string filter;
   wherein the singed coarse felt filter and the singed fine felt filter are wrapped around the string filter and attached with a hook and loop attachment device;
   wherein a low pressure float valve is in the lower canister, wherein when the lower canister is filled with filtered water, the float valve blocks the flow of water out of the filter; and
   wherein when the low pressure float valve blocks the flow of water out of the filter, the pre-filtered water collects in the upper canister.

\* \* \* \* \*